(12) United States Patent
Ballagas et al.

(10) Patent No.: US 8,766,921 B2
(45) Date of Patent: Jul. 1, 2014

(54) APPARATUS COVER WITH KEYBOARD (75) Inventors: Rafael A. Ballagas, Palo Alto, CA (US); Hiroshi Horii, Pacifica, CA (US)

(73) Assignee: Nokia Corporation, Espoo (FI)

(*) Notice: Subject to any disclaimer, the term of this patent is extended or adjusted under 35 U.S.C. 154(b) by 272 days.

(21) Appl. No.: 13/270,769

(22) Filed: Oct. 11, 2011

(65) Prior Publication Data
US 2013/0088431 A1    Apr. 11, 2013

(51) Int. Cl.
*G06F 3/02* (2006.01)
*G06F 1/16* (2006.01)
*G09G 5/00* (2006.01)

(52) U.S. Cl.
CPC ...... *G06F 1/1626* (2013.01); *G06F 2200/1634* (2013.01); *G06F 2200/1632* (2013.01); *G06F 2200/1633* (2013.01); *G06F 1/1632* (2013.01); *G09G 5/00* (2013.01); *G06F 3/0202* (2013.01); *G06F 1/1669* (2013.01); *G09G 2340/04* (2013.01)
USPC .......................................................... 345/168

(58) Field of Classification Search
None
See application file for complete search history.

(56) References Cited

U.S. PATENT DOCUMENTS

| 5,659,307 | A | 8/1997 | Karidis et al. ................... 341/22 |
| 6,882,524 | B2 | 4/2005 | Ulla et al. ...................... 361/680 |
| 7,025,274 | B2 | 4/2006 | Solomon et al. ......... 235/472.01 |
| 2003/0100338 | A1 | 5/2003 | Lee ................................ 455/556 |
| 2004/0058703 | A1 | 3/2004 | Eromaki et al. ............ 455/550.1 |
| 2005/0052831 | A1 | 3/2005 | Chen ............................. 361/680 |
| 2008/0079680 | A1* | 4/2008 | Fujita .............................. 345/89 |
| 2009/0102744 | A1* | 4/2009 | Ram ............................... 345/1.1 |
| 2009/0137280 | A1 | 5/2009 | Heikkinen et al. ............ 455/566 |
| 2009/0201254 | A1 | 8/2009 | Rais ............................... 345/168 |
| 2009/0295976 | A1* | 12/2009 | Choi ....................... 348/333.11 |
| 2011/0102328 | A1 | 5/2011 | Chen ............................. 345/169 |
| 2012/0068942 | A1* | 3/2012 | Lauder et al. ................. 345/173 |
| 2012/0140396 | A1 | 6/2012 | Zeliff et al. ............. 361/679.09 |
| 2012/0194448 | A1* | 8/2012 | Rothkopf ...................... 345/173 |
| 2012/0211377 | A1 | 8/2012 | Sajid ............................. 206/216 |

OTHER PUBLICATIONS http://www.alibaba.com/product-gs/472620183/tablet_pc_cover_with_keyboard . . . , "Tablet PC Cover with Keyboard", (printed Sep. 22, 2011), (4 pages).
http://www.zagg.com/acccessories/zaggfolio-ipad-2-keyboard-case . . ., "Apple iPad 2 Keyboard Case", (printed Sep. 22, 2011), (3 pages).
http://www.amazon.com/gp/product/B004XXQFMW/ref=as_li_ss_tl?ie=UTF8& . . ., "Acase ™iPad 2 $2^{nd}$ Generation KeyFolio Bluetooth Keyboard Accessory Case for Apple iPad 2 $2^{nd}$ Generation WiFi/3G Model 16 GB, 32 GB, 64GB Newest Model", (printed Sep. 22, 2011), (6 pages).
http://www.zagg.com/accessories/logitech-ipad-2-keyboard-case . . ., "Logitech Keyboard Case by ZAGG for iPad 2", (printed Sep. 22, 2011), (4 pages).

* cited by examiner

*Primary Examiner* — Adam R Giesy
*Assistant Examiner* — Henok Heyi
(74) *Attorney, Agent, or Firm* — Harrington & Smith (57) ABSTRACT An apparatus including a first section having a display; and a second section movably connected to the first section. The second section forms a cover for the display. The cover has a first portion and a second portion movably connected to the first portion. The first and second portions are configured to cover different portions of a front of the display. The second portion is pivotably connected to the first section by the first portion. The second portion has a keyboard thereon.

12 Claims, 8 Drawing Sheets

```
                                                    80
┌─────────────────────────────────────────────────┐/
│  MOVE PORTION OF A COVER RELATIVE TO A FIRST    │
│  SECTION FROM A FIRST POSITION TO A SECOND      │
│  POSITION TO PROVIDE A FIRST OPERATIONAL        │
│              CONFIGURATION                       │
└─────────────────────────────────────────────────┘
                        │
                                                    82
┌─────────────────────────────────────────────────┐/
│  MOVE THE COVER RELATIVE TO THE FIRST SECTION TO│
│  A SECOND DIFFERENT OPERATIONAL CONFIGURATION   │
│  WHERE THE DISPLAY IS COMPLETELY VISIBLE        │
└─────────────────────────────────────────────────┘
```

FIG.7

```
                                                    84
┌─────────────────────────────────────────────────┐/
│  MOVING A SECOND PORTION OF A COVER RELATIVE TO A FIRST │
│  PORTION TO A SECOND POSITION TO PROVIDE A FIRST│
│           OPERATIONAL CONFIGURATION              │
└─────────────────────────────────────────────────┘
                        │
                                                    86
┌─────────────────────────────────────────────────┐/
│  MOVING THE COVER RELATIVE TO THE FIRST SECTION TO│
│  PROVIDE A SECOND OPERATIONAL CONFIGURATION OF THE│
│  APPARATUS WHERE THE DISPLAY IS COMPLETELY UNCOVERED│
└─────────────────────────────────────────────────┘
                        │
                                                    88
┌─────────────────────────────────────────────────┐/
│  SWITCHING USE OF THE DISPLAY FROM A FIRST OPERATIONAL│
│  MODE IN THE FIRST OPERATION CONFIGURATION TO A SECOND│
│  OPERATION MODE IN THE SECOND OPERATIONAL       │
│              CONFIGURATION                       │
└─────────────────────────────────────────────────┘
```

APPARATUS COVER WITH KEYBOARD

BACKGROUND

1. Technical Field

The exemplary and non-limiting embodiments of relate generally to a reconfigurable form factor and, more particularly, to an apparatus having a display and a keyboard.

2. Brief Description of Prior Developments

Tablets are becoming an increasingly popular form factor, primarily because of its portable and comfortable form factor. People can use an on-screen virtual keyboard on a touch screen. However, such a screen virtual keyboard lacks the tactile feedback of physical keys to allow for touch typing. Thus, usage of tablets has been trending towards content consumption over content creation; primarily due to difficulties typing with an on-screen virtual keyboard. In the past, one could not simply add a keyboard without sacrificing portability or screen size.

SUMMARY

The following summary is merely intended to be exemplary. The summary is not intended to limit the scope of the claims.

In accordance with one aspect, an apparatus is provided including a first section having a display; and a second section movably connected to the first section. The second section forms a cover for the display. The cover has a first portion and a second portion movably connected to the first portion. The first and second portions are configured to cover different portions of a front of the display. The second portion is pivotably connected to the first section by the first portion. The second portion has a keyboard thereon.

In accordance with another aspect, an apparatus is provided comprising a display; a keyboard; and a housing configuration movably connecting the keyboard with the display. The housing configuration is configured to provide at least two typing positions of the keyboard relative to the display. A first one of the positions comprises the keyboard generally extending forward from a bottom side of a front of the display at an angle. A second one of the positions comprises the keyboard being located above a first portion of the front of the display with keys of the keyboard being located at a front outward facing side of the apparatus and a second portion of the display being located at the front outward facing side of the apparatus.

In accordance with another aspect, a method comprises moving a second portion of a cover of an apparatus relative to a first portion of the cover from a first position to a second position to provide a first operational configuration of the apparatus, where the first position comprises a keyboard on the second portion facing a front of a display on a first section of the apparatus, where the second position comprises the second portion being located on top of the first portion with the keyboard being located at a front outer side of the apparatus and only a portion of the front of the display being exposed at the front outer side of the apparatus; and moving the cover relative to the first section to a second different operational configuration where the display is completely visible.

In accordance with another aspect, a method comprises moving a second portion of a cover of an apparatus relative to a first portion of the cover from a first position to a second position to provide a first operational configuration of the apparatus, where the first position comprises the first and second portions covering a front of a display of the apparatus, and where the second position comprises a second portion of the display being exposed, a first portion of the display being covered by the cover, and the first and second portions of the cover being stacked together one above the other; moving the cover relative to the first section to provide a second operational configuration of the apparatus where the display is completely uncovered; and a controller switching use of the display from a first operational mode in the first operation configuration, where only the second portion of the display is used, to a second operation mode in the second operational configuration where the entire display is used.

In accordance with another aspect, a non-transitory program storage device is provided which is readable by a machine, tangibly embodying a program of instructions executable by the machine for performing operations, the operations comprising controlling display of information on a display of an apparatus to only a second portion of the display when the apparatus is in a first operational configuration, where the first operational configuration comprises a cover of the apparatus covering a first portion of the display and the second portion of the display not being covered by the cover; and controlling display of information on the display of the apparatus to both the second portion and a first portion of the display when the apparatus is in a second operational configuration, where the second operational configuration comprises the cover not covering the display.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
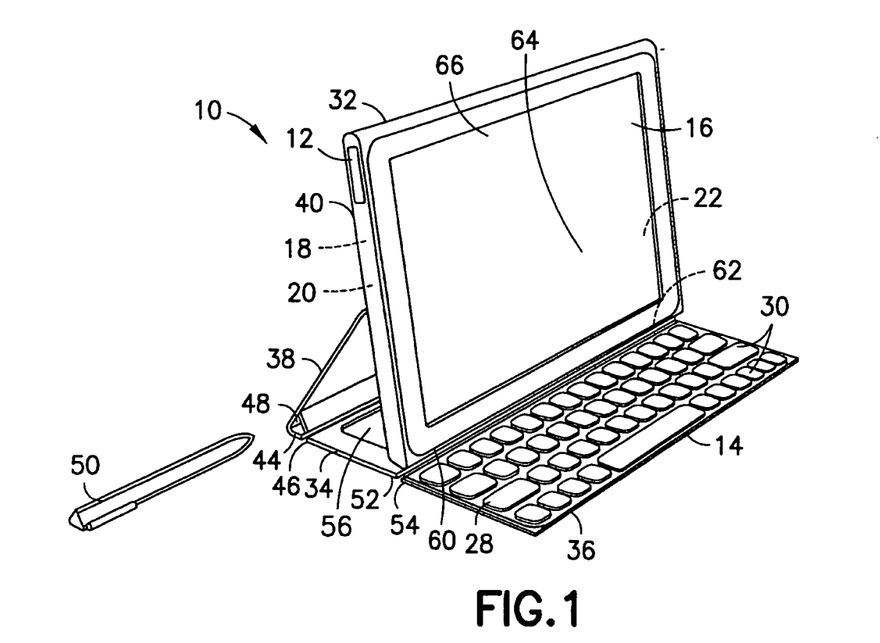
FIG. 1 is a perspective view of an example embodiment.

Referring to FIG. 1, there is shown a perspective view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
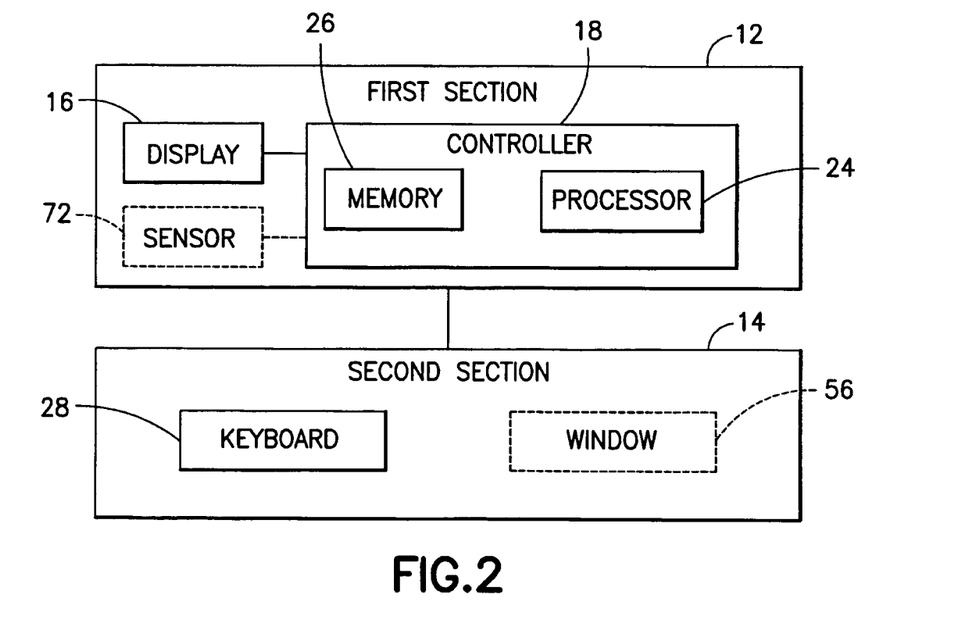
FIG. 2 is a diagram illustrating some of the components of the apparatus shown in FIG. 1.

The apparatus 10 is an electronic device similar to a laptop computer. However, features could be used in any suitable type of electronic device such as having applications such as Internet browsing, computer applications, etc. Referring also to FIG. 2, the apparatus 10 generally comprises a first section 12 and a second section 14. In this example embodiment the first section 12 generally comprises a display 16, a controller and a rechargeable battery 20. Circuitry 22 inside the first section comprises other components such as a transmitter, a receiver, and other components well known in laptop computers and tablet communication devices. The display 16 is a touch screen which is adapted to be used as an input device as well as a display device. However, in an alternate embodiment the display might not be a touch screen. The controller 18 generally comprises at least one processor 24 and at least one memory 26.

The second section 14 comprises a keyboard 28 having keys 30. The first and second sections 12, 14 form an overall housing for the apparatus 10. In this example, the first section 12 has a housing section 32 which, although comprised of multiple pieces, is generally monolithic. The housing section 32 may have, for example, the removable battery as part of the exterior, or flaps or doors at various connectors, but the overall perception is similar to a tablet type of handheld device.

Figure 3:
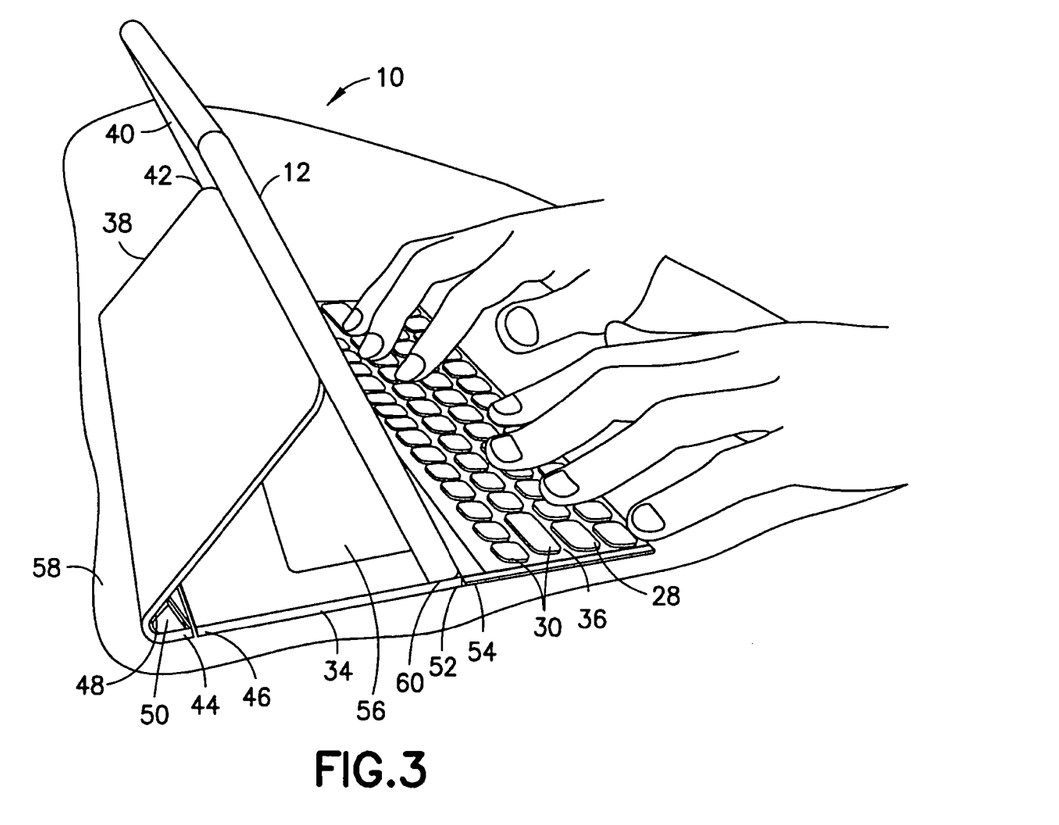
FIG. 3 is a perspective view of the apparatus shown in FIG. 1 from a different angle shown being used by a user in a first typing configuration.

Referring also to FIG. 3, the housing configuration of the second section 14 includes housing members which form a first portion 34, a second portion 36 and a connecting member 38. The second portion 36 has the keyboard 28 thereon. The connector member 38 is pivotably connected to a middle section of a rear side 40 of the first section 12. The first and second portions 34, 36 are connected in series to the first section 12 by the connecting member 38. The connecting member 38 has a substantially flat plate-like shape except at its two opposite ends; end 42 pivotably connected to the housing section 32 at the rear side of the first section 12, and end 44 pivotably connected to an end 46 of the first portion 34. In this embodiment the end 44 has a receiving space or slot 48 which is sized and shaped to removably receive a stylus 50. However, in an alternate embodiment the stylus 50 and the receiving space 48 might not be provided.

The first portion 34 has a substantially flat plate-like shape except at its two opposite ends; end 46 pivotably connected to the end 44 of the connecting member 38, and end 52 pivotably connected to an end 54 of the second portion 36. In this example the first portion comprises a window 56. The window 56 comprises transparent plastic. However, in an alternate embodiment the window 56 could be open or could comprise a transparent touch screen. In another alternate embodiment the window 56 might be replaced by a second display screen.

The second portion 36 has the keyboard 28 with the keys 30. Unlike a virtual keyboard provided on a touch screen, the keys 30 allow tactile feel to the user. Thus, a user can use touch typing with the keyboard. The end 54 is pivotably connected to the end 52 of the first portion 34.

The housing configuration of the apparatus provides a variable form factor. In other words, the apparatus 10 can be configured into different forms or configurations. FIG. 3 shows the apparatus 10 in a first configuration on a surface 58, such as a desktop for example. In this first configuration the first and second portions 34, 36 can lay flat against the surface 58. Thus, the keyboard 28 is appropriate supported by the surface 58 for the user to type on the keyboard 28. The first section 12 is supported on the second section 14 by the connection of the connecting member 38 against the rear side 40 and location of the side 60 of the housing section 32 on top of the second section 14 proximate the joint of the first and second portions 34, 36. The side 60 and second section 14 could have a suitable system, such as a disconnectable mechanical latch or interlock, or a magnet attachment system 62 to keep the side 60 at the position shown; at least until a user desires to re-configure the apparatus to a different configuration. In the first configuration shown, the keyboard 28 generally extending forward from a bottom side of a front of the display at an angle. Stated another way, the display 16 is angled for proper viewing by the user sitting at a chair at the desk having the surface 58.

Figure 4:
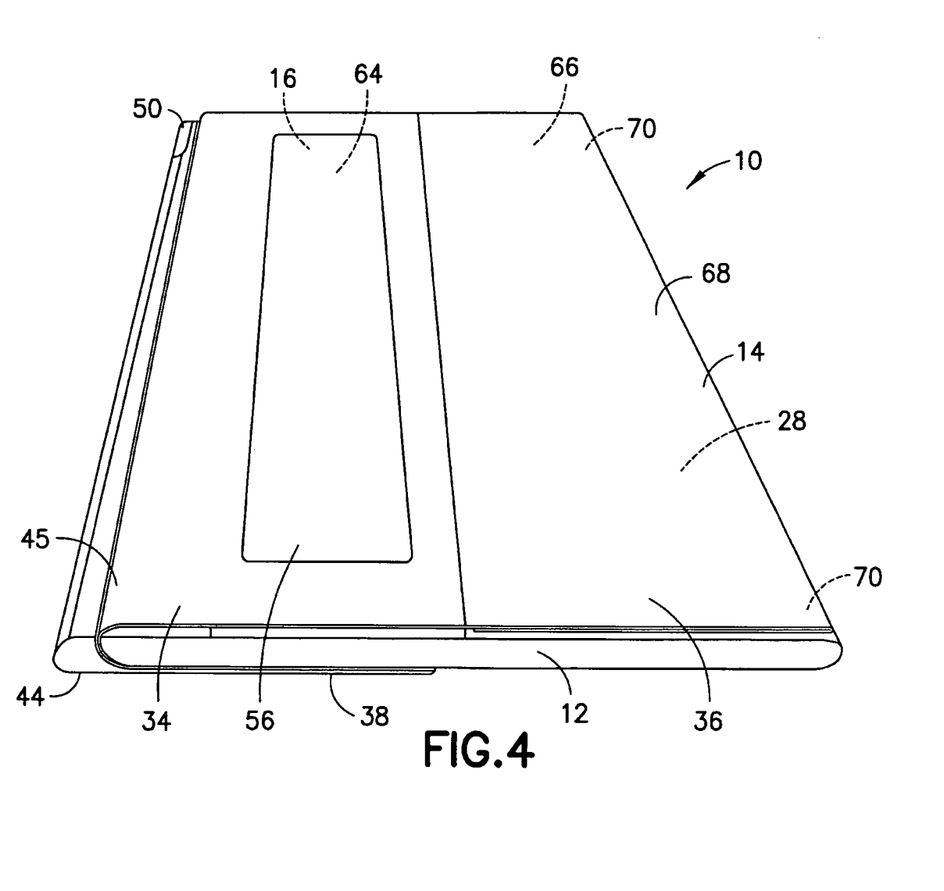
FIG. 4 is a perspective view of the apparatus shown in FIG. 1 in a closed configuration.

Referring now also to FIG. 4, the apparatus 10 is shown in a closed configuration. The second section has been moved relative to the first section 12 to cover the display 16. More specifically, the first and second portions 34, 36 form a cover which each cover a respective different portion of the display. The first portion 34 covers a first portion 64 of the front of the display 16 and the second portion 36 covers a second portion 66 of the front of the display 16.

In this closed configuration the connecting member 38 is located substantially flat against the rear side 40 of the first section 12 except for the end 44 which is located on a side of the first section 12. The keyboard 28 is located facing the second portion 66 of the display 16. The window 56 is located over part of the first portion 64 of the display 16. Thus, even though the display 16 is covered by the cover 68 (formed by the first and second sections 34, 36), the window allows a user to view information on the display at the first display portion 64 without having to open the cover 68. The overall shape of the apparatus 10 is that of a substantially flat and rectangular tablet; similar to a conventional tablet device. The cover 68 for the display can be maintained in its closed position by any suitable latch system, such as the magnet latch system 70 for example. Switching between the closed configuration (FIG. 4) and the first operational configuration (FIGS. 1 and 3) is relatively easy with the user merely needing to pivot the various portions/member 34, 36, 38 relative to the first section 12 and each other; and manipulating the position retaining systems 62, 70.

Figure 5:
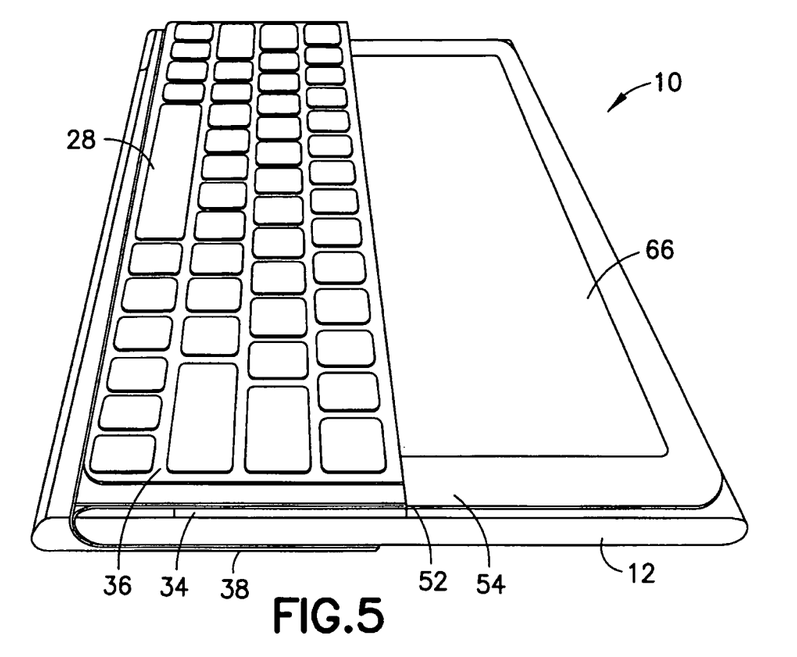
FIG. 5 is a perspective view of the apparatus shown in FIG. 3 in a second typing configuration.

Referring also to FIG. 5, the apparatus 10 has a second operational configuration. Comparing the second operational configuration shown in FIG. 5 to the closed configuration shown in FIG. 4, the first portion 34 and the connecting member 38 are in the same locations relative to each other and the first section 12 in both the closed configuration and the second operational configuration. Only the second portion 36 has been moved. In particular, the second portion 36 has been flipped about 180 degrees relative to the first portion 34; pivoting at the junction between the two ends 52, 54. The second section 36 is, thus, stacked on top of the first portion 34. The second portion 66 of the display is exposed and clearly visible to the user. The apparatus has the keyboard 28 and the second portion 66 of the display 16 on the same outward facing side in substantially parallel planes; almost in the same plane. The first portion 34 and the first section 12 provide a good rigid support for use of the keyboard 28. The overall configuration of the apparatus is still substantially flat and tablet-like. This type of configuration provides a second typing position where a user can use the keyboard 28 to type information into the apparatus and still see the display (at least partially). The configuration shown in FIG. 5 is particularly well suited for locating the apparatus 10 on a user's lap and typing into the apparatus.

Figure 5A:
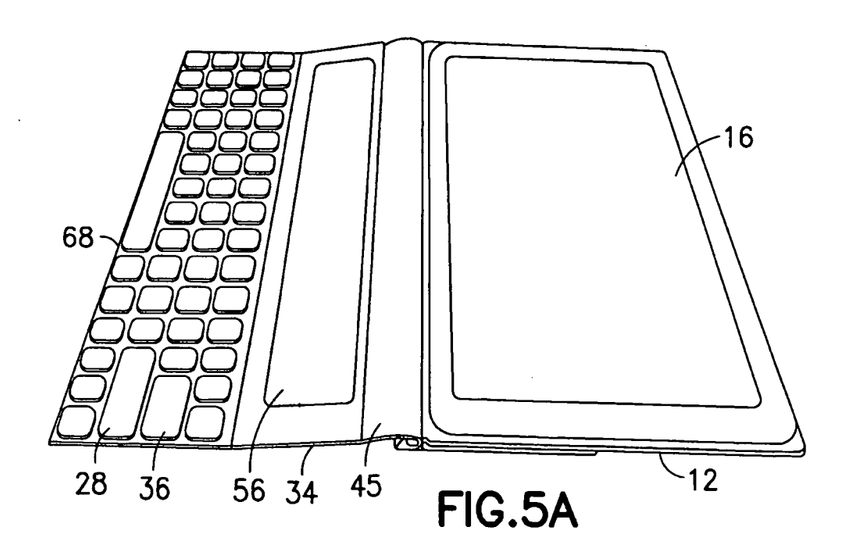
FIG. 5A is a perspective view of the apparatus shown in FIG. 5 with the cover moved to an open position similar to a magazine page.

Referring also to FIG. 5A, the apparatus 10 is shown where the cover 68 has been flipped open from the closed position shown in FIG. 4 about 180 degrees, similar to flipping open a page of a magazine. Thus, the cover 68 does not need to be flipped 360 degrees around the tablet 12 as shown in FIG. 5. In this example, the connection 45 of the cover 68 to the tablet 12 is a flexible connection, but any suitable connection could be provided. In an alternate example embodiment, the connecting member 38 might not be provided. The back side of the tablet section 12 might have a fold out stand (not shown) similar to a picture frame which could be pivoted out to allow the tablet section 12 to stand up so a user could type on the keyboard 28 and view the display at an upstanding inclined angle similar to the position shown in FIG. 3.

Figure 6:
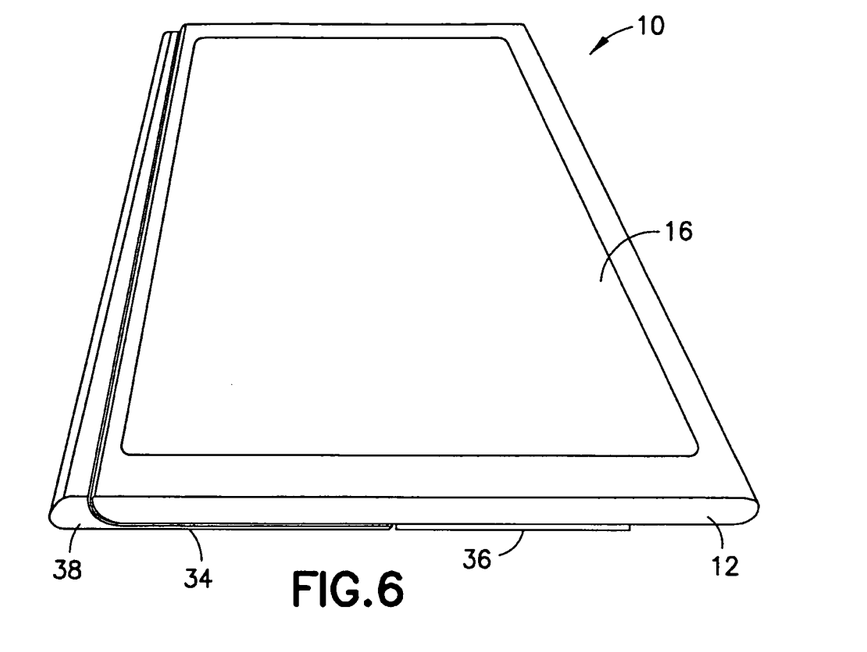
FIG. 6 is a perspective view of the apparatus shown in FIG. 6 in a third operational configuration.

Referring also to FIG. 6, the apparatus 10 has a third operational configuration. Comparing the third operational configuration shown in FIG. 6 to the closed configuration shown in FIG. 4, the connecting member 38 is in the same location relative to the first section 12 in both the closed configuration and the third operational configuration. Referring also to FIG. 6, the opposite side of the apparatus 10 is shown. Only the cover 68 (both the first portion 34 and the second portion 36) has been moved. In particular, the cover 68 has been flipped about 360 degrees relative to the first section 12; pivoting at the junction between the two ends 44, 46. In this third operational configuration the display 16 is now completely visible and the keyboard (on the second portion 36) faces the rear side 40 of the first section 12. This third operational configuration allow the apparatus 10 to be used similar to a conventional tablet device, such as for web browsing or E-book reading for example. The touch screen display 16 can be used as a user interface such as by touch of the user's finger and/or by use of the stylus 50. The cover can be retained against the rear side such as by a latch system, such as a magnetic retaining system for example. The keyboard 28 will face downward during tablet-like use of the display 16 by the user, but any keystrokes can be ignored by the controller 18 based upon the sensed position of the cover 68 in this folded configuration.

Figure 6A:
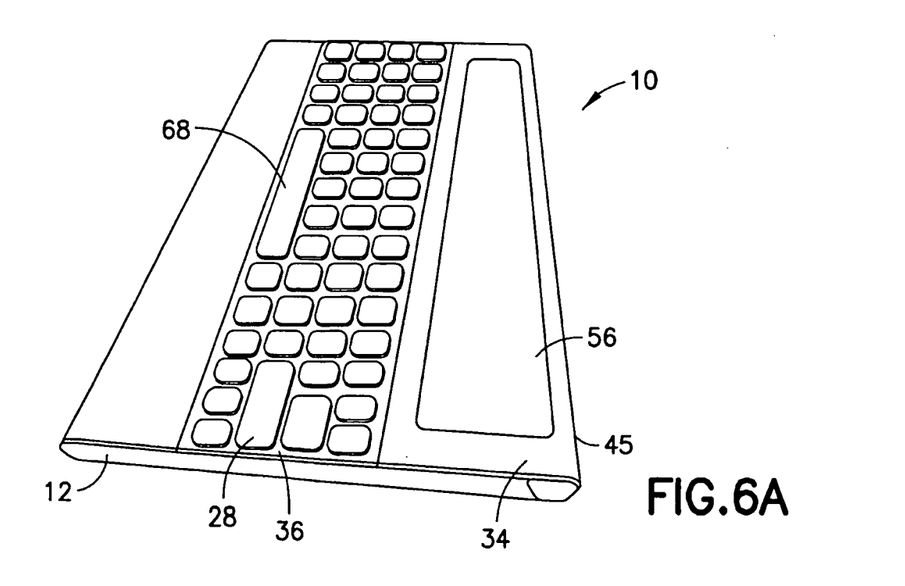
FIG. 6A is a perspective view of the apparatus shown in FIG. 6 in the third operation configuration, showing the opposite side.
Figure 14:
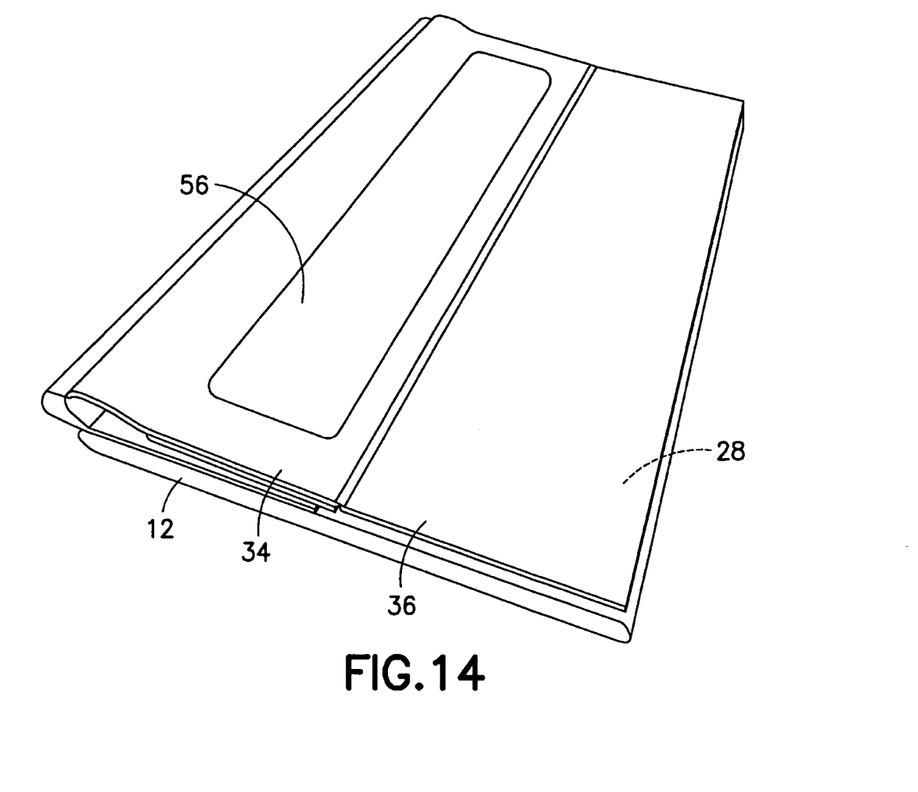
FIG. 14 is a perspective view similar to FIG. 6A of an alternate example embodiment where the keyboard is located against the back of the tablet in the third operational configuration.

Referring also to FIG. 14, an alternate example embodiment is shown in the configuration similar to FIG. 6A. In this example, with the cover folded under the tablet, rather than the keyboard 28 being located at the exterior downward facing side of the apparatus, the keyboard faces the rear side of the tablet 12 and is protected. For this example embodiment, in the configuration similar to FIG. 4, the keyboard 28 would be at the exterior of the apparatus rather than facing the display 16. In this example embodiment the cover could be folded open similar to the configuration shown in FIG. 5A, but the second portion 36 could be flipped on top of the first portion 34 to have the keyboard 28 facing upward for use in typing. The back side of the tablet section 12 might have a fold out stand (not shown) similar to a picture frame which could be pivoted out to allow the tablet section 12 to stand up so a user could type on the keyboard 28 and view the display 16 at an upstanding inclined angle similar to the position shown in FIG. 3.

The example embodiment described above relates to a physical mechanism to add a keyboard to a tablet computer. Most commonly today, people use an on-screen virtual keyboard, which lacks tactile feedback of physical keys to allow for touch typing. Although several keypad covers exist on the market today for tablets, the example embodiment described above is unique because it allows for typing in a comfort computing scenario, e.g. in the lap.

Tablets are becoming an increasingly popular form factor, primarily because of its portable and comfortable form factor. However, usage of tablets has been trending towards content consumption over content creation, primarily due to difficulties typing with an on-screen virtual keyboard. One cannot simply add a keyboard without sacrificing portability or screen size. The example embodiment described above creates a novel mechanism to integrate the keyboard into the protective cover for the tablet, making it seem like the user is not carrying anything more than the tablet. Additionally, the example embodiment described above provides a novel mechanism to allow for typing in both a desktop posture, as well as a lap posture (also referred to as comfort computing posture).

Bluetooth keyboards are widely available for tablets, however these solutions impede portability by giving users something additional to carry. Several commercially available covers exist that integrate a keyboard into the tablet protective cover. These cover/keyboard accessories focus on desktop typing. For lap typing (comfort computing), only the on-screen keyboard is currently available in conventional devices.

With the example embodiment described above, when the cover is closed, the keyboard is facing down towards the display (see FIG. 4). The notification window 56 on the cover 68 allows for users to get ambient notifications from the tablet while the tablet is in a sleep mode. The tablet 12 can comprise one or more sensors 72 (see FIG. 2) to sense when the cover is closed and disable accidental keyboard input.

In the comfort computing position, a hinge down the middle of the cover (between ends 52, 54) allows the cover to fold in half along the keyboard edge to expose the keyboard so that the keyboard covers the notification window and approximately half of the tablet display (see FIG. 5). In this mode, the physical keyboard takes as much screen real estate as a virtual on-screen keyboard. However, the keys 30 are tactile to allow for touch typing. The tablet can sense (such as by sensor(s) 72) the comfort computing keyboard configuration and adjusts the user interface (UI) for keyboard entry in this mode (similar to the way a UI is transformed for on-screen keyboard input).

In the desktop computing position, a hinge at the back of the tablet allows the cover to be oriented almost perpendicular to the device (see FIGS. 1 and 3). A magnet between the keyboard and notification window can fasten the tablet in place to stabilize the device pose. The tablet can sense (such as by sensor(s) 72) the desktop computing keyboard position, and can adjust the UI for keyboard entry in this mode.

When the cover is completely open, it is completely wrapped around the device positioning the keyboard to face the back of the tablet (see FIG. 6). The tablet 12 can sense (such as by sensor(s) 72) that the keyboard is in this mode and the controller 18 can disable physical keyboard entry to avoid accidental key presses. Based on the keyboard orientation, the tablet can also re-enables an on-screen keyboard functionality and activate the on-screen keyboard on demand.

The cover 68 can also be completely removed. When no keyboard is detected, the device can use on-screen keyboard input. With the example embodiment described above the cover can also hold a stylus to support pen-based input. With the example embodiment described above the cover can be electrically connected to the tablet 12 through a connector in the middle of the back of the device. This allows the cover to be powered through the tablet battery and minimizes the cover thickness by removing the requirement for a separate cover battery. Alternative implementations could allow the cover to connect wirelessly with the tablet.

An advantage of the example keyboard cover design described above is that it allows for touch typing (with keyboard 28) in both the desktop computing mode as well as the comfort computing mode. This allows people to continue to use tablets in more mobile and comfortable scenarios without sacrificing portability and requiring users to carry a secondary keyboard.

The example embodiment described above can provide a physical mechanical keyboard that supports four (4) different postures:

Posture 1: Closed tablet cover
Posture 2: Comfort computing tactile keyboard
Posture 3: Desktop computing tactile keyboard
Posture 4: Cover folded behind the tablet The example embodiment described above provides an ability to support all four (4) of these postures in one physical tablet cover.

The example embodiment described above, thus, provides the following configurations:

FIGS. 1 and 3. Desktop computing mode. The cover lays flat on the desk, and the tablet snaps to the middle of the cover to stabilize this orientation through a magnetic mechanism. The electrical connection is made through the middle of the back of the tablet.

FIG. 4. Cover in closed position. Notification window is visible to user. The keyboard is facing down towards the display.

FIG. 5. Keyboard in comfort computing mode. The cover is folded over from a hinge in middle to expose the keyboard as well as half of the tablet display. The keyboard is now covering the notification window.

FIG. 6. Open cover. The cover is wrapped around the back of the device. The keyboard is exposed facing outward towards the desk.

The example embodiment described above can provide an apparatus 10 comprising a first section 12 comprising a display 16; and a second section 14 movably connected to the first section, where the second section comprises a cover 68, where the cover 68 comprises a first portion 34 and a second portion 36 movably connected to the first portion, where the first and second portions are configured to cover different portions 64, 66 of a front of the display 16, where the second portion 36 is pivotably connected to the first section 12 by the first portion 34, and where the second portion 36 comprises a keyboard 28 thereon.

The display may comprise a touch screen. The second section may comprise a connector member 38 pivotally connecting the first portion to a middle section of a back side 40 of the first section. The connector member may comprises a receiving space 48 configured to allow a stylus 50 to be removably mounted inside the receiving space. The second section 14 may be configured to provide at least two typing positions of the keyboard relative to the display, where a first one of the typing positions comprises the keyboard generally extending forward from a bottom side of a front of the display at an angle, where a second one of the typing positions comprises the keyboard being located above a first portion of the front of the display with keys of the keyboard being located at a front outward facing side of the apparatus and a second portion of the display being located at the front outward facing side of the apparatus. The apparatus may comprise a controller configured to control display of information on the display, where the controller is configured to display the information on only the second portion 66 of the display when the apparatus is in the second typing position, and where the controller is configured to display the information on both the second portion of the display and the first portion 64 of the display when the apparatus is in the first typing position. The first portion may comprise a window 56 to allow a user to view the first portion 64 of the display when the cover is in a closed position over the display. The controller 18 may be configured to display the information on only the first portion 64 of the display when the cover is in the closed position over the first and second portions of the display. The second section 14 may be connected to the first section 12 such that the cover is adapted to be moved to a rear side 40 of the first section generally flat against the rear side.

The example embodiment described above can provide an apparatus 10 comprising a display 16; a keyboard 28; and a housing configuration 32, 34, 36, 38, movably connecting the keyboard with the display, where the housing configuration is configured to provide at least two typing positions of the keyboard relative to the display, where a first one of the positions comprises the keyboard generally extending forward from a bottom side of a front of the display at an angle, where a second one of the positions comprises the keyboard being located above a first portion of the front of the display with keys of the keyboard being located at a front outward facing side of the apparatus and a second portion of the display being located at the front outward facing side of the apparatus.

The apparatus comprises means 18, 72 for controlling display of information on the display based upon location of the second portion relative to the first portion and based upon location of the second section relative to the first section. The housing configuration may comprises a first section 12 having the display thereon and a second section 14 forming a cover adapted to cover the display, where the cover has the keyboard thereon, and where the housing configuration is adapted to allow the cover to be moved to a rear side of the first section to provide a tablet configuration of the apparatus with the display completely visible on the front side of the apparatus. The housing configuration may comprise a first section having the display thereon and a second section forming a cover adapted to cover the display, where the second section comprises a first portion and a second portion pivotably connected to the first portion, where the first portion is configured to cover the first portion of the display, and where the second portion has the keyboard thereon. The cover may have the keyboard thereon, where the first typing position comprises a side of the first section resting on top of the second section proximate a joint between the first and second portions of the second section. The housing configuration may comprise a first section having the display thereon and a second section forming a cover adapted to cover the display, where the second section comprises a first portion and a second portion pivotably connected to the first portion, where the first and second portions are configured to respectively cover the first and second portions of the display, and where the second section comprises a connecting member which pivotably connects the first portion to a middle section of a rear side of the first section.

Figure 7:
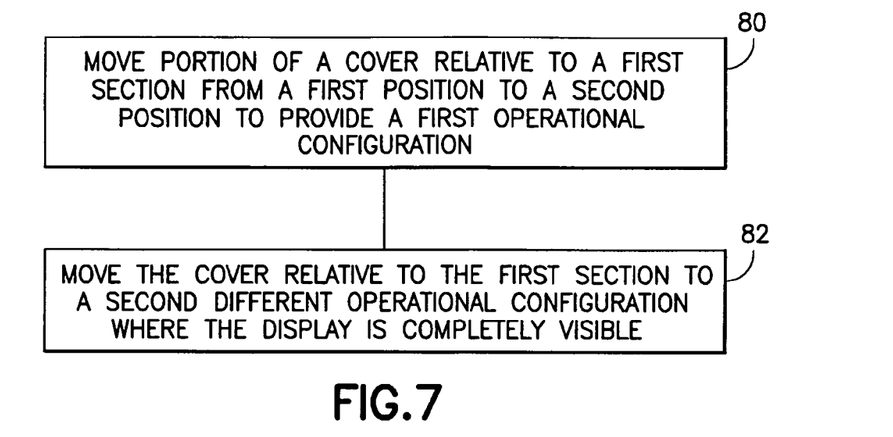
FIG. 7 is a diagram illustrating steps of an example method.

Referring also to FIG. 7, a method may comprise moving a second portion of a cover of an apparatus relative to a first portion of the cover from a first position to a second position to provide a first operational configuration of the apparatus as indicated by block 80, where the first position comprises a keyboard on the second portion facing a front of a display on a first section of the apparatus, where the second position comprises the second portion being located on top of the first portion with the keyboard being located at a front outer side of the apparatus and only a portion of the front of the display being exposed at the front outer side of the apparatus; and moving the cover relative to the first section to a second different operational configuration as indicated by block 82 where the display is completely visible.

Moving the second portion relative to the first portion may comprise pivoting the second portion at a joint with the first portion. Moving the cover to a second operational position may comprise pivoting the cover on the first section to a rear side of the first section, where the second operational position comprises a tablet configuration of the apparatus with the display completely visible on the front outer side of the apparatus. Moving the cover to a second operational position may comprise locating a side of the first section on the second section proximate a joint between the first and second portions of the cover.

Figure 8:
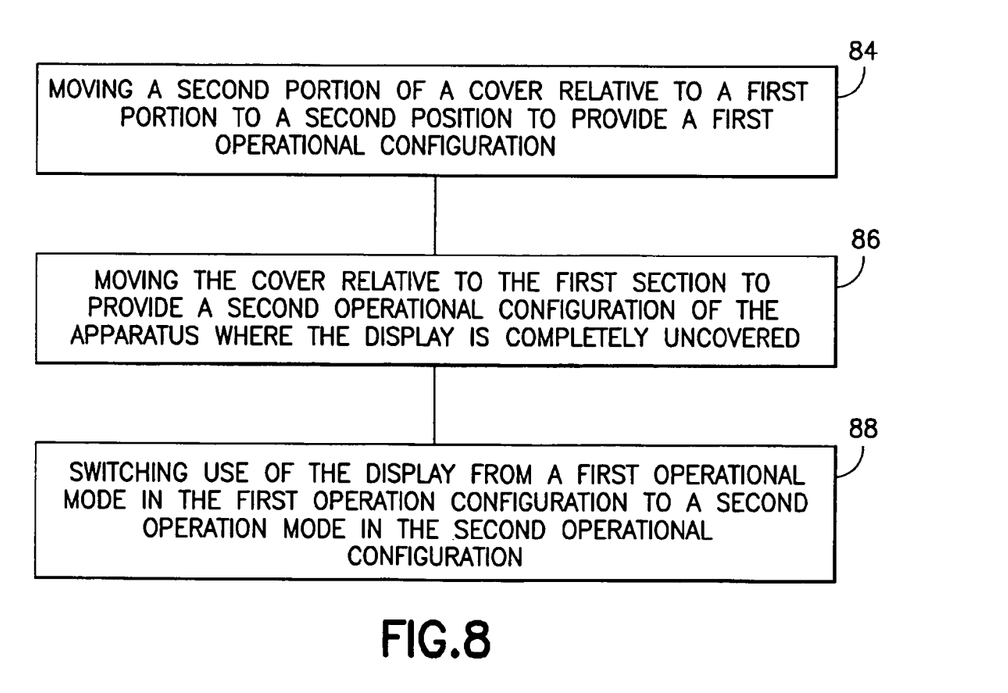
FIG. 8 is a diagram illustrating steps of another example method.

Referring also to FIG. 8, a method may comprise moving a second portion of a cover of an apparatus relative to a first portion of the cover from a first position to a second position to provide a first operational configuration of the apparatus as indicated by block 84, where the first position comprises the first and second portions covering a front of a display of the apparatus, and where the second position comprises a second portion of the display being exposed, a first portion of the display being covered by the cover, and the first and second portions of the cover being stacked together one above the other; moving the cover relative to the first section to provide a second operational configuration of the apparatus where the display is completely uncovered as indicated by block 86; and a controller switching use of the display from a first operational mode in the first operation configuration, where only the second portion of the display is used, to a second operation mode in the second operational configuration as indicated by block 88 where the entire display is used.

The example embodiment described above can provide a non-transitory program storage device, such as memory 26 or a CD-ROM for example, readable by a machine, tangibly embodying a program of instructions executable by the machine for performing operations, the operations comprising controlling display of information on a display of an apparatus to only a second portion of the display when the apparatus is in a first operational configuration, where the first operational configuration comprises a cover of the apparatus covering a first portion of the display and the second portion of the display not being covered by the cover; and controlling display of information on the display of the apparatus to both the second portion and a first portion of the display when the apparatus is in a second operational configuration, where the second operational configuration comprises the cover not covering the display.

Figure 9:
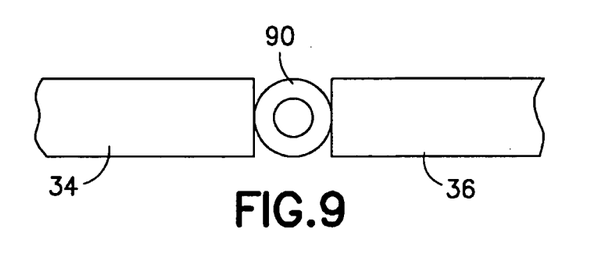
FIG. 9 is a side view of a hinge used in the apparatus shown in FIG. 1.
Figure 10:
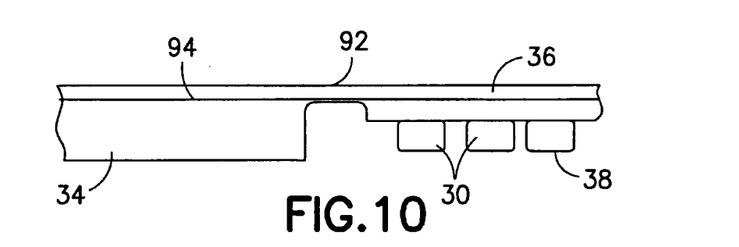
FIG. 10 is a side view of an alternate embodiment of a hinge.

Referring also to FIG. 9, the pivotable connection between the first and second portions 34, 36 of the second section 14 may comprise a hinge 90 between two substantially rigid sections of the portions 34, 36. However, as illustrated in FIG. 10, the pivotable connection between the first and second portions 34, 36 of the second section 14 may comprise a living hinge 92 between two substantially rigid sections of the portions 34, 36; such as formed by a flex circuit 94 forming a substrate member for the keyboard.

Figure 11:
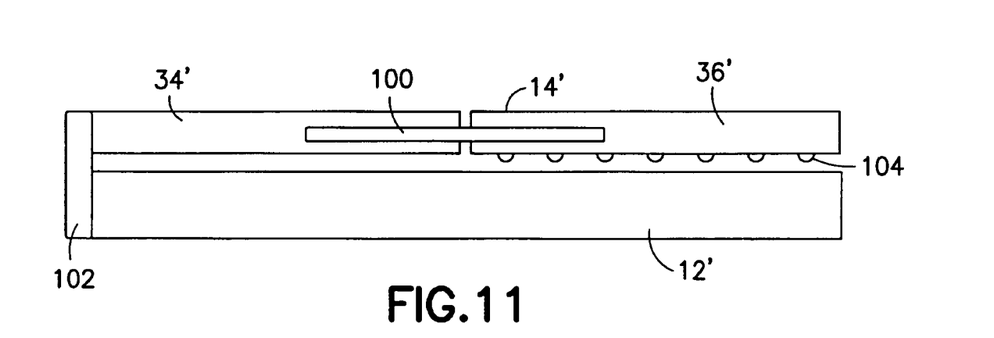
FIG. 11 is a schematic side view of an alternate embodiment.
Figure 12:
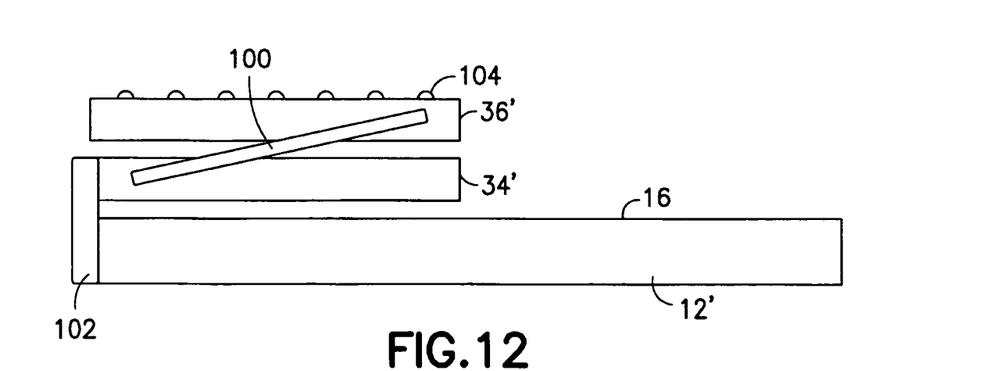
FIG. 12 is a side view of the alternate embodiment shown in FIG. 11 at a first operational configuration.
Figure 13:
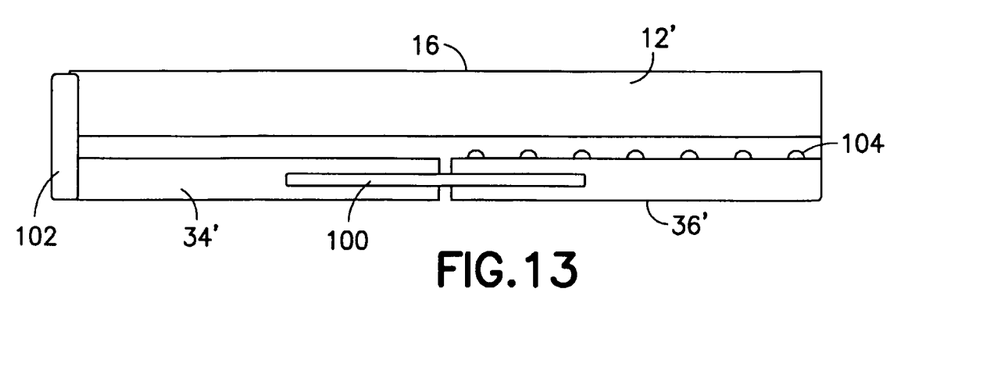
FIG. 13 is a side view of the alternate embodiment shown in FIG. 12 at a second operational configuration.

Referring to FIG. 11, an alternate embodiment is shown comprising a first section 12', and a second section 14'. The second section 14' comprises a first portion 34' and a second portion 36' comprising a user input 104. The first and second portions 34', 36' are pivotably connected to each other by a link 100. The first portion 34' is pivotably connected to the first section 12' by a link 102. FIG. 11 shows the second section 14' functioning as a cover for the display on the first section 12' in a closed configuration. FIG. 12 shows the second portion 36' rotated to a stacked position on the first section 34' for a first operational configuration. In this first operational configuration a user can input information into the user input 104 and view a portion of the display 16. FIG. 13 shows the second section 14' rotated at the link 102 to locate the second section 14 under the first section 12' with the display 16 now completely visible. This illustrates that the operational configuration shown in FIG. 1 need not be provided, and any suitable input 104 could be used; not necessarily a keyboard with keys, and that any suitable movable connection between the two sections 12', 14' could be provided, and that any suitable movable connection between the two portions 34', 36' could be provided.

In the embodiment shown in FIGS. 1-6 the second section 14 can be provided with the first section or tablet 12 as an assembly when initially sold to the consumer. However, the second section 14 or cover 68 could be sold as an accessory which can be attached after the tablet 12 is sold to the user (an aftermarket accessory). In this type of embodiment a user enabled connection could be provided to allow the user to attached the second section 14 or cover 68; perhaps removably connect. The connection could provide a power connection to the battery in the tablet 12 and/or a signal connection between the keyboard and the circuitry in the tablet. The second section 14 or cover 68 could have its own battery if desired. The communications link between the keyboard and the tablet could be wireless, such as BLUETOOTH for example.

A method may comprising moving a cover 68 of an apparatus relative to a tablet section 12 of the apparatus from a first position (FIG. 4) at a first side of the tablet section to a second position (FIG. 6) at a second opposite side of the tablet section, where the first side has a display 16 which the cover 68 covers in the first position, where the cover comprises a keyboard 28, and where the cover comprises a window 56 to view a portion 64 of the display when the cover is in the first position; and a controller 18 switching use of the display from a first operational mode in the first position of the cover, where only the portion 64 of the display is used, to a second operation mode in the second position of the cover where the entire display 64, 66 is used. The keyboard 28 may be located facing the second opposite side of the tablet section in the second position of the cover (FIG. 14).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
a first section comprising a display; and
a second section movably connected to the first section, where the second section comprises a cover, where the cover comprises a first portion and a second portion movably connected to the first portion, where the first and second portions are configured to cover different portions of a front of the display, where the second portion is pivotably connected to the first section by the first portion, and where the second portion comprises a keyboard thereon, where the cover is movable relative to the first section, and the first and second portions are movable relative to each other, to provide at least two different locations of the keyboard relative to the display for a user to use the keyboard, where the cover is movable relative to the first section from a closed position over the display, at a front side of the first section, to an open position at a back side of the first section, where the keyboard directly faces the back side of the first section in the open position, where the apparatus comprises means for controlling display of information on the display based upon location of the second portion relative to the first portion and based upon location of the second section relative to the first section.

2. An apparatus as in claim 1 where the second section comprises a connector member pivotably connecting the first portion to a middle section of a back side of the first section.

3. An apparatus as in claim 2 where the connector member comprises a receiving space configured to allow a stylus to be removably mounted inside the receiving space.

4. An apparatus as in claim 1 where the second section is configured to provide at least two typing positions of the keyboard relative to the display, where a first one of the typing positions comprises the keyboard generally extending forward from a bottom side of a front of the display at an angle, where a second one of the typing positions comprises the keyboard being located above a first portion of the front of the display with keys of the keyboard being located at a front outward facing side of the apparatus and a second portion of the display being located at the front outward facing side of the apparatus.

5. An apparatus comprising:
a first section comprising a display;
a second section movably connected to the first section, where the second section comprises a cover, where the cover comprises a first portion and a second portion movably connected to the first portion, where the first and second portions are configured to cover different portions of a front of the display, where the second portion is pivotably connected to the first section by the first portion, and where the second portion comprises a keyboard thereon, where the cover is movable relative to the first section, and the first and second portions are movable relative to each other, to provide at least two different locations of the keyboard relative to the display for a user to use the keyboard, where the cover is movable relative to the first section from a closed position over the display, at a front side of the first section, to an open position at a back side of the first section, where the keyboard directly faces the back side of the first section in the open position; and
a controller configured to control display of information on the display, where the controller is configured to display the information on only the second portion of the display when the apparatus is in the second typing position, and where the controller is configured to display the information on both the second portion of the display and the first portion of the display when the apparatus is in the first typing position.

6. An apparatus as in claim 5 where the first portion comprises a window to allow a user to view the first portion of the display when the cover is in a closed position over the display.

7. An apparatus as in claim 6 where the controller is configured to display the information on only the first portion of the display when the cover is in the closed position over the first and second portions of the display.

8. An apparatus as in claim 1 where the second section is connected to the first section such that the cover is adapted to be moved to a rear side of the first section generally flat against the rear side.

9. A method comprising:
moving a second portion of a cover of an apparatus relative to a first portion of the cover from a first position to a second position to provide a first operational configuration of the apparatus, where the second portion comprises a keyboard, where the first position comprises the first and second portions covering a front of a display of the apparatus, and where the second position comprises a second portion of the display being exposed, a first portion of the display being covered by the cover, and the first and second portions of the cover being stacked together in a stacked shape one above the other with the keyboard on top of the stacked shape;
moving the cover relative to the first section to provide a second different operational configuration of the apparatus where the display is completely uncovered; and
a controller switching use of the display from a first operational mode in the first operation configuration, where only the second portion of the display is used, to a second operation mode in the second operational configuration where the entire display is used.

10. A method comprising:
moving a cover of an apparatus relative to a tablet section of the apparatus from a first position at a first side of the tablet section to a second position at a second opposite side of the tablet section, where the first side has a display which the cover covers in the first position, where the cover comprises a keyboard, and where the cover comprises a window to view a portion of the display when the cover is in the first position; and
a controller switching use of the display from a first operational mode in the first position of the cover, where only the portion of the display is used, to a second operation mode in the second position of the cover where the entire display is used.

11. A method as in claim 10 where the keyboard is located facing the second opposite side of the tablet section in the second position of the cover.

12. A non-transitory program storage device readable by a machine, tangibly embodying a program of instructions executable by the machine for performing operations, the operations comprising:
controlling display of information on a display of an apparatus to only a second portion of the display when the apparatus is in a first operational configuration, where the first operational configuration comprises a cover of the apparatus covering a first portion of the display and the second portion of the display not being covered by the cover, where in the first operational configuration the information is prevented from being displayed on the first portion; and
controlling display of information on the display of the apparatus to both the second portion and a first portion of the display when the apparatus is in a second operational configuration, where the second operational configuration comprises the cover not covering the display.

* * * * *